United States Patent [19]

Srivastava et al.

[11] 3,764,734

[45] Oct. 9, 1973

[54] AUTOMATIC PEAK COLOR CONTROL

[75] Inventors: Gopal Krishna Srivastava, Amherst; Joseph Edward Thomas, Batavia, both of N.Y.

[73] Assignee: GTE Sylvania Incorporated, Seneca Falls, N.Y.

[22] Filed: June 7, 1972

[21] Appl. No.: 260,660

[52] U.S. Cl. .......................................... 178/5.4 AC
[51] Int. Cl. ............................................ H04n 9/48
[58] Field of Search ............................... 178/5.4 AC

[56] References Cited

UNITED STATES PATENTS 3,141,064 7/1964 Macovski ...................... 178/5.4 AC

*Primary Examiner*—Richard Murray
*Attorney*—Norman J. O'Malley et al.

[57] ABSTRACT

The color level of a chroma signal in a color television receiver is automatically maintained by applying a chroma signal to a variable gain amplifier and utilizing a detector for applying the output signal back to the variable gain amplifier to vary the gain inversely with the peak level of the applied chroma signal and provide a substantially constant level of peak chroma signal independent of the percentage of chroma in the signal.

8 Claims, 12 Drawing Figures

AUTOMATIC PEAK COLOR CONTROL

BACKGROUND OF THE INVENTION

In the color television field, undesired chroma variations in the broadcast signal are usually of the type wherein the color burst and chroma signals vary simultaneously or the ratio of chroma to burst signal changes. The simultaneous type of color burst and chroma variations is usually due to variations in the broadcast signal or to a multipath propagation of the signal. The color burst to chroma ratio variations are frequently caused by re-insertion of the burst signal by a local station or a deterioration of the desired ratio in the network broadcast system.

As to minimization of the above-mentioned undesirable signal conditions, the simultaneous variations of chroma and burst signals may be compensated by an automatic color control (ACC) system which is dependent upon and varies with changes in the magnitude of the color burst signal. Unfortunately, a high gain ACC system has a deleterious effect upon the type of signal variation wherein the burst to chroma ratio is altered. Moreover, the high gain ACC system will undesirably exaggerate the color burst to chroma signal ratio variations.

One known attempt to remedy such undesired alterations in the color burst to chroma signal ratio includes the utilization of an average detection system. Therein, the average value of the chroma content is utilized to control the gain of the chroma color amplifier stages. However, it has been found that average detection fails to maintain the peak value of the chroma signal whereupon both over-saturated and "washed-out" colors appear in many scenes.

OBJECTS AND SUMMARY OF THE INVENTION

Therefore, an object of the present invention is to provide enhanced color control circuitry for a color television receiver. Another object of the invention is to provide improved color control circuitry for "tracking" the peak level of an applied chroma signal. Still another object of the invention is to provide improved color control circuitry for detecting and maintaining a substantially constant level of peak chroma signals. A further object of the invention is the detection and maintenance of a peak chroma signal level with color control apparatus including combined average and threshold detectors.

These and other and further objects, advantages and capabilities are achieved in one aspect of the invention by color control circuitry wherein the peak level of a signal from a chroma signal source is amplified, detected, and the gain of the amplifier altered in accordance with the detected signal to provide a substantially constant value of peak chroma signal.

DESCRIPTION OF THE PREFERRED EMBODIMENT

For a better understanding of the present invention, together with other and further objects, advantages and capabilities thereof, reference is made to the followingg disclosure and appended claims in connection with the accompanying drawings.

Figure 1:
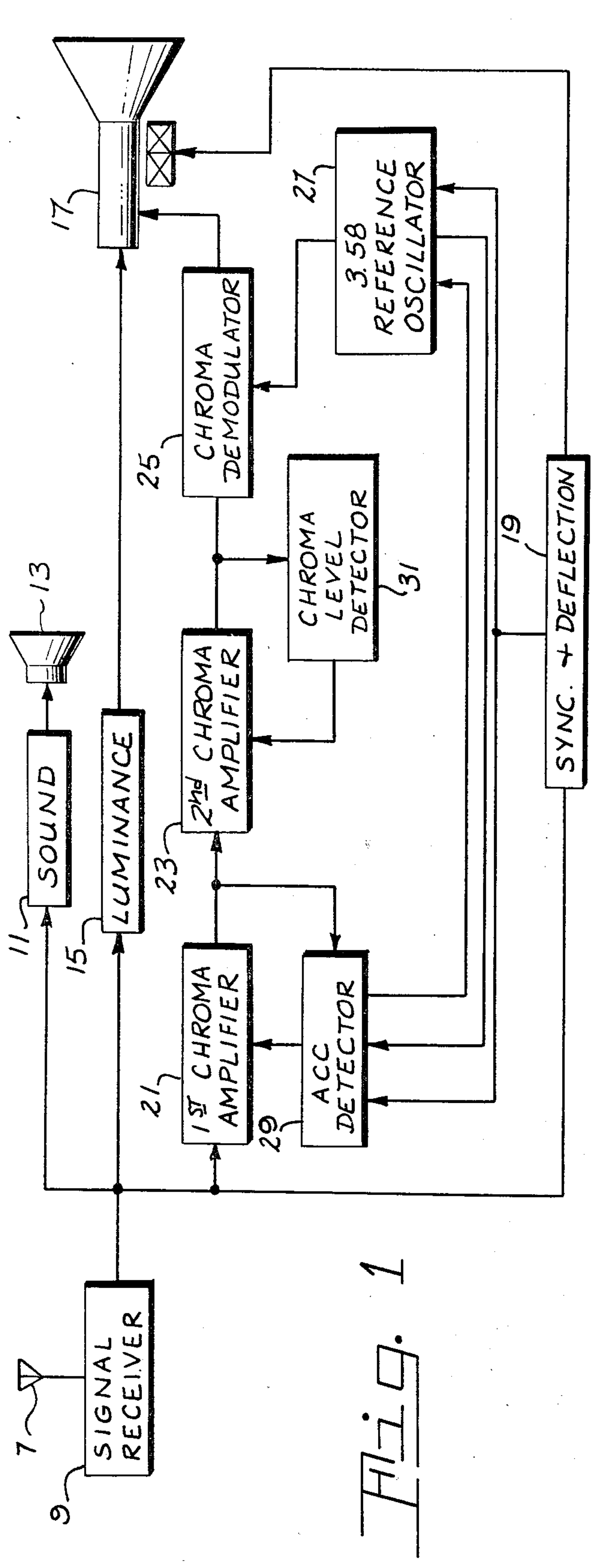
FIG. 1 illustrates, in block form, a color television receiver embodying one concept of applicants' invention.

Referring to the drawings, FIG. 1 illustrates a color television receiver having an antenna 7 for intercepting transmitted signals and applying the signals to a signal receiver 9. In a manner well known in the art, the signal receiver 9 provides an output signal which is applied to a sound channel 11, coupled to a loudspeaker 13. Another output signal from the receiver 9 is applied to a luminance channel 15 coupled to a color picture tube 17. Still another output signal from the receiver 9 is applied to synchronizing and deflection circuitry 19 which is also coupled to the picture tube 17.

Also, an output signal from the signal receiver 9 is applied to a first chroma amplifier stage 21 which provides and applies amplified chroma or color signals to a second chroma amplifier stage 23. A chroma or color demodulator stage 25 is coupled to the second chroma amplifier stage 23 and to a 3.58 reference oscillator stage 27. Thus, demodulated chroma signals are available from the demodulator stage 25 and applied to the color picture tube 17.

An automatic chroma control (ACC) stage 29 is coupled to the output of the first chroma amplifier stage 21 and to the 3.58 oscillator stage 27. A color burst signal from the output of the first chroma amplifier stage 21 and a burst gating pulse from the sync and deflection circuitry 19 is applied to the ACC stage 29 which is, in turn, coupled back and adjusts the gain of the first chroma amplifier stage 21, to maintain a uniform burst amplitude at the input of the second chroma amplifier stage 23. As a result, the first chroma amplifier stage 21 provides fairly constant burst amplitude signals suitable for use with automatic phase control detector stages (APC) (not shown) and also provides chroma signals compensated for any undesired shift in color burst signals.

Further, a chroma level detector stage 31 responds to chroma output signals of the second chroma amplifier stage 23 to provide a signal for automatically controlling the gain of the second chroma amplifier stage 23. Thus, in addition to the ACC stage 29 for controlling the chroma signal level in accordance with the color burst signal level, an automatic color control circuit is provided for maintaining chroma signal at a desired selected level which varies in accordance with the peak value of the chroma signal.

Figure 2A:
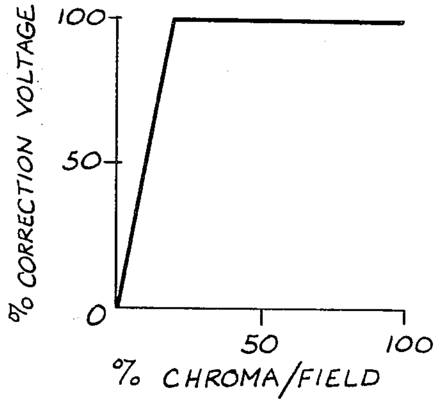
FIG. 2A–2C is a graphic illustration and comparison of response for peak, average, and threshold type signal detection systems.
Figure 2B:
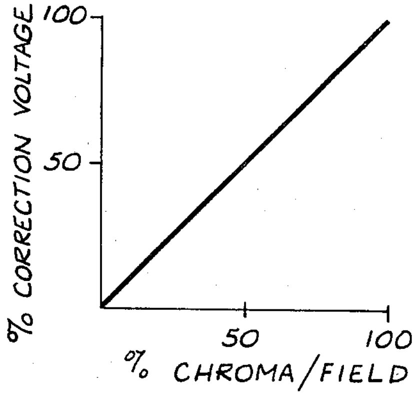
Figure 2C:
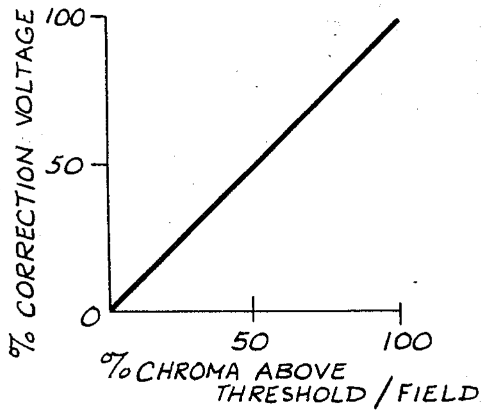

As to the form of the chroma level detector stage 31, it is known that detector stages may employ any one of a number of well-known techniques. For example, a peak signal level detector normally provides a response as indicated in FIG. 2A. Therein, the percentage correction voltage is substantially constant regardless of the percentage of chroma per scanning field except for a very small initial period of change On the other hand, an average signal level detector provides a response, indicated in FIG. 2B, which varies as the percentage of chroma in a scanning field varies. Similarly, a threshold signal level detector provides a response, FIG. 2C, which also varies with the percentage of chroma above a given threshold level of a scanning field. Thus, it would appear that a peak level detector would be selected in preference to an average or threshold detector so long as the maintenance of a substantially constant level of peak chroma signal over a wide range of scene or chroma changes is desired.

Also, it is known that a peak level detector has a noise bandwidth which varies in accordance with its efficiency, which is a function of the horizontal frequency (15.75 kHz.) of the television receiver. Thus, the noise bandwidth of a peak level detector for a television receiver is in the range of about 315 kHz. As can be seen in FIG. 2A, the noise bandwidth is dependent upon the initial slope of the curve i.e., the steeper the slope the higher the noise bandwidth. However, average and threshold detectors have a noise bandwidth which varies in accordance with the vertical deflection frequency (60 Hz.) of the television receiver or a noise bandwidth of something less than about 60 Hz. As evident from FIGS. 2B and 2C, the slope of the curve is not as great as the slope of the curve of 2A whereupon a reduced bandwidth for average and threshold detectors, as compared with peak detectors, is indicated. Thus, it would appear that a peak level detector should be chosen to provide the control signal based upon changes in scene content while an average or threshold detector would preferably be employed to provide a minimum noise bandwidth.

However, it has been found that the desired percentage correction voltage vs. percentage chroma field characteristics of a peak level detector can be synthesized by employing an average detector to modify a threshold detector. Such a preferred combination not only provides the desired minimum value of noise bandwidth but also provides the desired peak level response substantially independent of the percentage of chroma in a scene as will be explained hereinafter.

Figure 3:
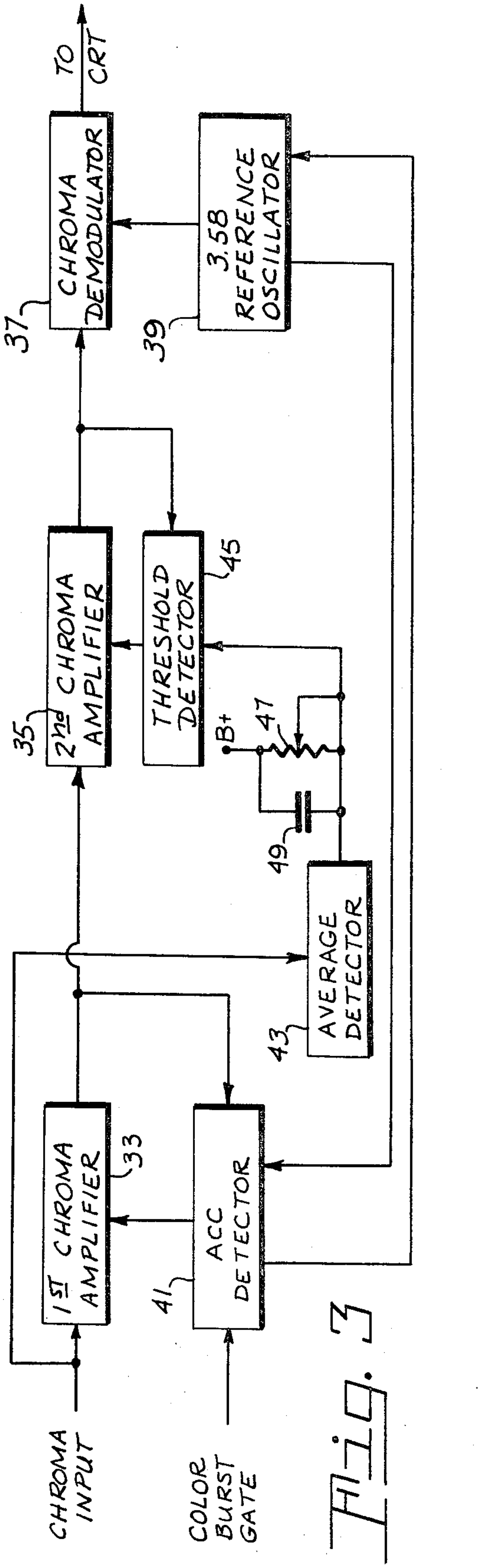
FIG. 3 illustrates, in block form, an alternative form of detection system suitable for use in a color television receiver.

More specifically, FIG. 3 illustrates a preferred form of color control circuitry applicable for use with the color television receiver of FIG. 1. Herein, a first chroma amplifier stage 33 is coupled to a chroma or color signal source and provides an amplified chroma signal which is applied to a second chroma amplifier stage 35. The second chroma amplifier stage 35 provides an output signal which is applied to a chroma or color demodulator stage 37 which also receives an output signal from a 3.58 reference oscillator stage 39. The demodulator stage 37 provides output signals suitable for amplification and application to a cathode ray tube system.

An automatic chroma control (ACC) and detection stage 41 receives color burst gate signals from a source. Also, the ACC stage 41 receives signals from and applies signals to the 3.58 reference oscillator stage 39. Output signals from the first chroma amplifier stage 33 are applied to the ACC detector stage 41 which, in turn, applies signals to and alters the response of the first chroma amplifier stage 33 in accordance with variations in the received color burst signals.

Also, an average detector means 43 receives chroma signals available at the input of the first chroma amplifier stage 33 and applies a DC signal to a threshold detector means 45. The threshold detector means 45 also receives output signals (chroma and burst) from the second chroma amplifier stage 35 and these signals in conjunction with the signals from the average detector means 43 serve to provide a color control signal for altering the gain response of the second chroma amplifier stage 35. Moreover, an adjustable impedance 47 shunted by a capacitor 49 is coupled to a potential source B+ and the junction of the average and threshold detectors, 43 and 45 respectively whereby a threshold level and eventually the gain of the second chroma amplifier stage 35 is controlled.

Figure 4:
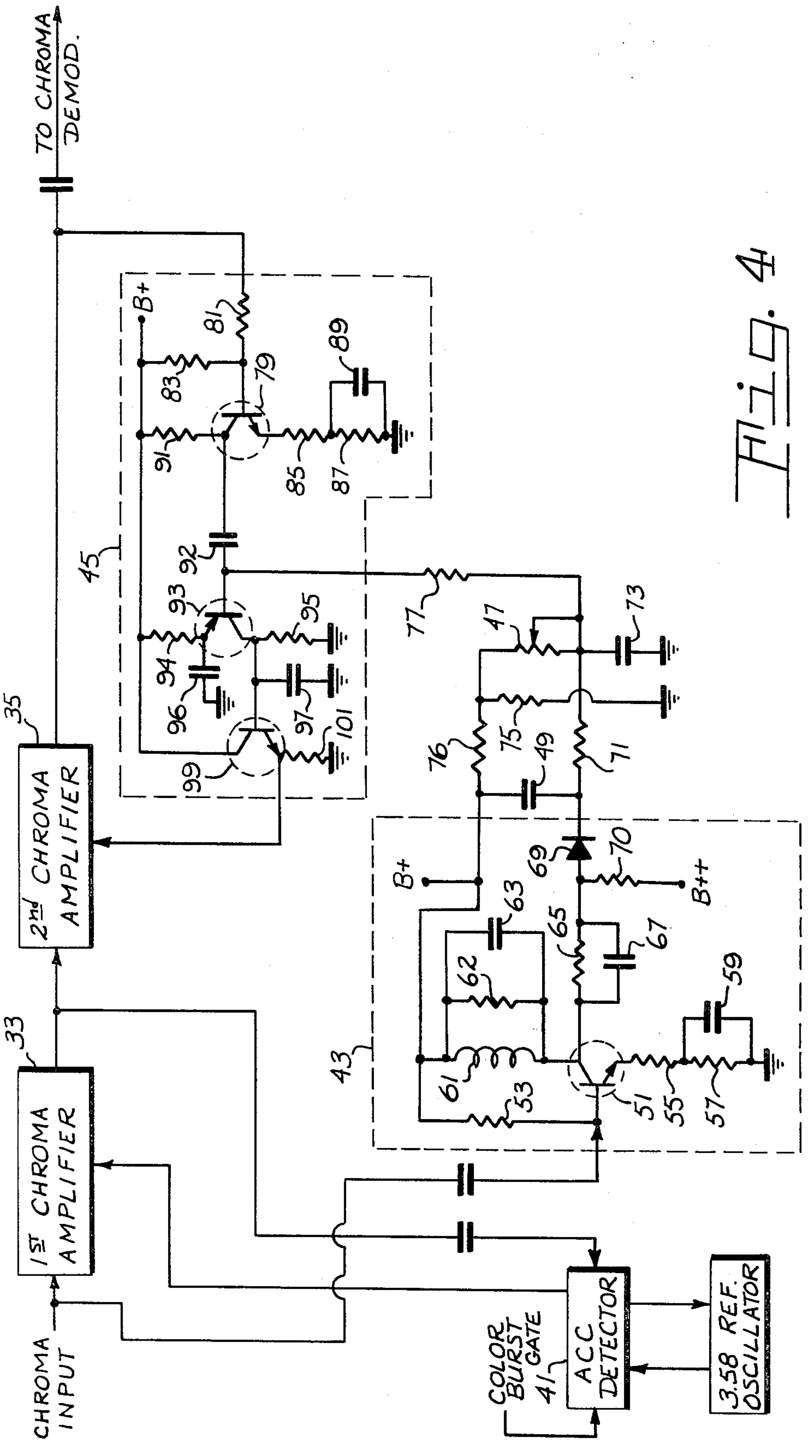
FIG. 4 illustrates, in block and schematic form, the embodiment of FIG. 3.

In greater detail, a preferred form of the color control circuitry of FIG. 3 is set forth in block and schematic form in FIG. 4. Therein, the first chroma amplifier stage 33 receives a chroma input signal which is applied to a second chroma amplifier stage 35 coupled to a chroma demodulator. Also, the ACC detector stage 41 receives a color burst signal from the output of the first chroma amplifier stage 33, as well as a signal from a 3.58 reference oscillator and a burst gating pulse. Moreover, the ACC detector 41 provides a control signal for the first chroma amplifier stage 33 in accordance with variations in the applied color burst signals.

Chroma signals from the input of the first chroma amplifier stage 33 are coupled to the input of the average detector means 43. Herein, an amplifier stage includes a transistor 51 having a base electrode coupled to receive the chroma signal from the input of the first chroma amplifier stage 33 and by a resistor 53 to a potential source B+; an emitter electrode coupled by series connected first and second resistors, 55 and 57, to a potential reference level with a capacitor 59 shunting the second resistor 57; and a collector electrode coupled via a parallel connected inductor 61, resistor 62, and capacitor 63 to the potential source B+ and via a parallel connected resistor 65 and shunting capacitor 67 to the anode of a diode detector 69.

The anode of the diode detector 69 is also coupled by a resistor 70 to a second potential source B++. The cathode of the diode detector 69 is coupled to a resistor 71 connected to an adjustable impedance 47 coupled by a resistor 76 connected to the potential source B+. Also, a capacitor 49 couples the cathode of the diode detector 69 to the potential source B+ while another capacitor 73 couples the adjustable impedance 47 and resistor 71 to the potential reference level. Moreover, series connected resistors 75 and 76 couple the potential source B+ to the potential reference level and another resistor 77 couples the adjustable resistor 47 to the threshold detector means 45.

The threshold detector means 45 includes a first transistor 79 having a base electrode coupled by a resistor 81 to the output of the second chroma amplifier stage 35 and by a second resistor 83 to the potential source B+. An emitter electrode is coupled by series connected first and second resistors 85 and 87 to a potential reference level with a capacitor 89 shunting the second resistor 87. The collector electrode is coupled by a resistor 91 to the potential source B+ and via a coupling capacitor 92 to the base electrode of a second transistor 93.

The base electrode of the second transistor 93 is also connected via the resistor 77 to the average detector means 43. The emitter electrode is connected via a resistor 94 to the potential source B+ and via a capacitor 96 to a potential reference level while the collector electrode is coupled via a parallel connected resistor 95 and capacitor 97 to the potential reference level and directly to the base electrode of a third transistor 99. This third transistor 99 has a collector electrode coupled to the potential source B+ and an emitter electrode coupled directly to the second chroma amplifier stage 35 and via a resistor 101 to the potential reference level.

As to operation, an output signal from the second chroma amplifier stage 35 is applied to an amplifier stage in the form of a first transistor 79 of the threshold detector means 45. The amplified output from this first transistor 79 is applied to the base of a threshold detector stage including the transistor 93. This detector transistor 93 is biased to a non-conductive state by a threshold potential applied to the base electrode via the resistor 77. However, when the negative half cycle of the chroma signal applied to the base of the detector transistor 93 exceeds the threshold bias potential applied to the base electrode via the resistor 77, conduction of the detector transistor 93 is effected.

Upon conduction of the detector transistor 93, the current appearing at the collector electrode is proportional to the difference between the peak chroma signal and the threshold potential. This conduction current partially charges the capacitor 97 where this charge is stored, due to the relatively long discharge time of about ten times the field rate frequency as determined by the capacitor 97 and resistor 95. Thus, a DC potential, which is an average of all chroma peak signals exceeding the threshold potential at the base of the detecotr transistor 93, is developed at the capacitor 97. This average DC potential is applied via a third transistor 99, acting as an emitter follower stage, to the second chroma amplifier stage 35. Thus, a closed loop feedback system is effected to provide adjustments in gain of the second chroma amplifier stage 35 and a substantially constant level of chroma signal applied to the chroma demodulators of a color television receiver.

It should be noted that proper operation of the system requires the presence of a burst signal along with the chroma signal at the input of the threshold detector, since the burst signal acts as the minimum amount of peak chroma signal acceptable by the system. In a scene where the peak chroma signal does not exceed the peak color burst signal, the peak color burst signal becomes the controlling factor. Now, the color burst signal will go to the selected peak value and the chroma signal will increase porportionally but not to the peak value. Thus, the situation where a scene which is intended to have an unsaturated color goes to a fully saturated color is avoided.

As to the level of the chroma signals applied to the chroma demodulators, the threshold potential serves to determine the desired level. This threshold potential is developed by the average detector means 43 and more particularly a chroma amplifier stage, indicated by the transistor 51, and an average detector, indicated by the diode 69.

The chroma signal from the input of the first chroma amplifier stage 33, representative of the percentage chroma per field, is applied to the base of the amplifier transistor 51. In turn, the output of the amplifier transistor 51 is applied to the diode detector 69. In turn, the diode detector 69 has a load circuit in the form of the variable resistor 47 which serves to provide the desired level of chroma control.

Further, it may be noted that the load circuit of the amplifier transistor 51 is in the form of a tank circuit, including the inductor 61 and capacitor 63, whereby the DC gain of the amplifier is substantially zero andd the setting of the color level control, resistor 47, is virtually independent of the collector current, bias, and parameter variations of the amplifier transistor 51. Moreover, the color level control, resistor 47, provides excellent tracking between the color level setting and the threshold modifiying voltage.

Figure 5A:
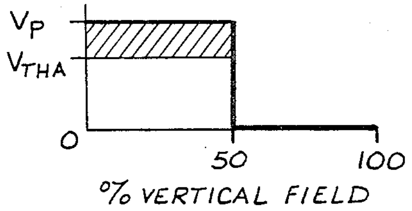
FIG. 5A–5F includes explanatory graphs and charts applicable to the embodiment of FIGS. 3 and 4.

Additionally, the previously-mentioned utilization of a combined average and threshold detection system to achieve a desired peak level response substantially similar to that of a peak level detector, i.e., independent of the percentage of chroma in a scene may best be explained by reference to the illustrations of FIGS. 4A–5F. In FIG. 5A, a scene which includes chroma in 50 percent of the vertical field would include a peak voltage $V_p$ and a threshold potential $V_{tha}$ with the correction voltage or DC output voltage of the threshold detector 45 represented by the shaded area.

Figure 5C:
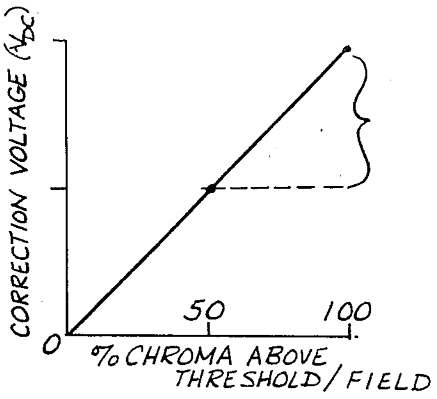
Figure 5B:
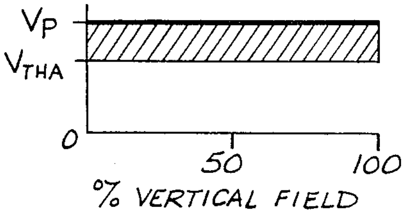
Figure 5D:
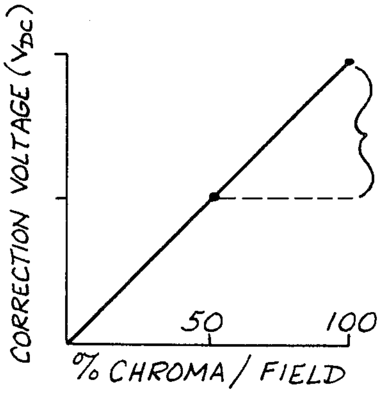
Figure 5E:
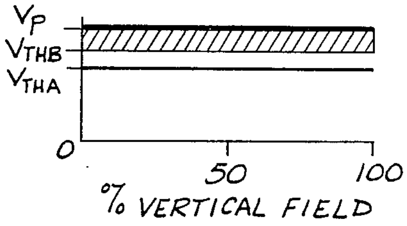
Figure 5F:
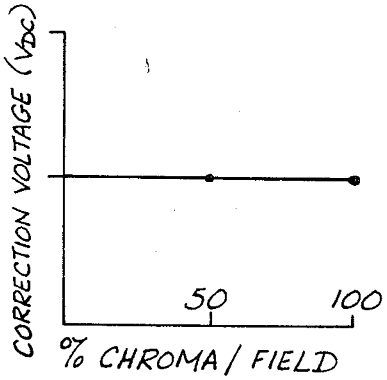

Should the percentage chroma content of the field increase from fifty percent (50 percent) to one hundred percent (100 percent), the percent correction voltage would double as can be readily seen by the shaded area of FIG. 5B and the graph of FIG. 5C. Since the average detector means 43 also has a doubled output when the percentage of chroma increases from fifty percent (50 percent) to one hundred percent (100 percent) as shown in FIG. 5D, the threshold voltage will be altered to a new value indicated by $V_{thb}$ of FIG. E. Thus, the shaded area which represents the correction voltage will remain substantially the same regardless of the percentage of chroma in a scene because of the shift in threshold level from $V_{tha}$ to $V_{thb}$. Moreover, the correction voltage applied to the second chroma amplifier means 35 will be a substantially constant value (FIG. 5F) providing a substantially constant value of chroma, independent of the type of the scene, for the demodulators despite chroma variations at the signal receiver output.

Thus, there has been provided unique color control circuitry for a color television receiver. The circuitry provides control of the peak chroma level of the received signals whereby the image display is virtually unaffected by undesired but frequently present changes in the ratio of the color burst signal to the chroma signal. Moreover, the system in conjunction with the well-known ACC system provides control over undesired simultaneous burst and chroma changes as well as burst to chroma ratio changes.

While there has been shown and described what is at present considered the preferred embodiment of the invention, it will be obvious to those skilled in the art that various changes and modifications may be made therein without departing from the invention as defined by the appended claims.

What is claimed is:

1. In a color television receiver, color control circuitry comprising:

a color signal source;

variable gain amplifier means having color signal input and output circuits with said signal input circuit coupled to said color signal source; and detector means including a threshold detector means coupling said color signal output circuit to said variable gain amplifier means and an average detector means coupling said color signal input circuit to said threshold detector means whereby a control signal representative of a peak color signal is applied to said variable gain amplifier means.

2. The color control circuitry of claim 1 wherein said average detector means includes an alterable impedance coupled intermediate thereto and said threshold detector means for selecting a desired peak color signal level.

3. The color circuitry of claim 2 wherein said alterable impedance is in the form of an adjustable resistor.

4. The color control circuitry of claim 1 wherein said detector means provides an output signal proportional to said peak color signal and independent of the percentage of chroma in a color signal.

5. The color control circuitry of claim 1 wherein said detector means has a noise bandwidth less than about 60 Hz.

6. A color control circuit for a color television receiver comprising:

a color signal source;

a color signal demodulation means;

variable gain amplifier means having an input circuit coupled to said color signal source and an output circuit coupled to said demodulation means; and detector means in the form of a combined threshold detector coupling said output circuit to said variable gain amplifier means and an average detector coupling said input circuit to said threshold detector to modify the threshold, whereby the gain of said variable amplifier means varies in accordance with variations in the peak color signal applied to said input circuit to provide a substantially constant peak color signal level independent of the percentage of chroma of said output circuit.

7. The color control circuit of claim 6 wherein said detector means includes an alterable impedance for selecting a desired peak level of color signal.

8. The color control circuit of claim 7 wherein said alterable impedance is in the form of an adjustable resistor whereby a selected peak level of color signal is provided at said output circuit of said variable gain amplifier means.

* * * * *